(12) United States Patent
Maxwell

(10) Patent No.: US 10,435,858 B2
(45) Date of Patent: Oct. 8, 2019

(54) MODULAR GRID FOUNDATION

(71) Applicant: Lawrence S. Maxwell, Pearland, TX (US)

(72) Inventor: Lawrence S. Maxwell, Pearland, TX (US)

( * ) Notice: Subject to any disclaimer, the term of this patent is extended or adjusted under 35 U.S.C. 154(b) by 136 days.

(21) Appl. No.: 14/164,963

(22) Filed: Jan. 27, 2014

(65) Prior Publication Data

US 2015/0059264 A1 Mar. 5, 2015

Related U.S. Application Data

(60) Provisional application No. 61/872,907, filed on Sep. 3, 2013.

(51) Int. Cl.
*E02D 5/28* (2006.01)
*E02D 5/80* (2006.01)
(Continued)

(52) U.S. Cl.
CPC ............. *E02D 5/28* (2013.01); *E02D 5/285* (2013.01); *E02D 7/02* (2013.01); *E02D 7/06* (2013.01);
(Continued)

(58) Field of Classification Search
CPC ....... E04H 12/2215; E02D 5/80; E02D 27/12; E02D 27/16; E02D 27/42; E02D 27/425;
(Continued)

(56) References Cited

U.S. PATENT DOCUMENTS 798,945 A * 9/1905 Bernston ............ E04H 12/2215
52/154
844,294 A * 2/1907 Winslow ............... E02D 5/80
52/155

(Continued)

FOREIGN PATENT DOCUMENTS

DE 2207543 A1 * 8/1973 ............... E02D 5/04
DE 102006041049 A1 * 3/2008 ............ E02B 3/108
(Continued)

OTHER PUBLICATIONS

Machine Translation of DE2207543; http://translationportal.epo.org/emtp/translate/?ACTION=description-retrieval&COUNTRY=DE&ENGINE=google&FORMAT=docdb&KIND=A1&LOCALE=en_EP&NUMBER=2207543&OPS=ops.epo.org/3.2&SRCLANG=de&TRGLANG=en; Oct. 15, 2018 (Year: 2018).*

*Primary Examiner* — Ryan D Kwiecinski
(74) *Attorney, Agent, or Firm* — Polsinelli PC

(57) ABSTRACT

The present invention is an earth-locking apparatus and an inextricably intertwined method to form an underground grid-bridge system to provide foundation support for structures such as sand silos, holding tanks, bulkheads, and power transmission lines. The earth-locking modular apparatus has locking lugs and locking channels perpendicularly connected to a plurality of vanes that extend vertically the length of the central tubular member whereby interlocking vanes are conjoined to multiple modular apparatus allowing for confined compaction of columns and blocks of soil that are then subjected to a porosity destruction process to tighten and de-water the confined soil. The method of completing the underground grid-bridge describes the utilization of the compaction apparatus designed to work in conjunction with the earth-locking modular apparatus and earth-locking compaction implements design-engineered to cause porosity destruction resulting in extreme compression of confined soil to a load-bearing capacity that will resist compression, overturning, uplifting, torsion and sheer.

12 Claims, 17 Drawing Sheets

(51) Int. Cl.
*E02D 7/02* (2006.01)
*E02D 27/16* (2006.01)
*E02D 7/06* (2006.01)
*E02D 7/18* (2006.01)
*E04H 12/20* (2006.01)
*E04H 12/08* (2006.01)
*E04H 12/10* (2006.01)

(52) U.S. Cl.
CPC .................. *E02D 7/18* (2013.01); *E02D 5/80* (2013.01); *E02D 27/16* (2013.01); *E04H 12/08* (2013.01); *E04H 12/10* (2013.01); *E04H 12/20* (2013.01); *Y02B 10/30* (2013.01)

(58) Field of Classification Search
CPC .... E02D 5/04; E02D 5/06; E02D 5/08; E02D 5/28; E02D 5/285; E02D 5/54; E02D 7/02; E02D 7/04; E02D 7/06; E02D 7/18
See application file for complete search history.

(56) References Cited

U.S. PATENT DOCUMENTS

| | | | | |
|---|---|---|---|---|
| 865,080 | A * | 9/1907 | Candee | E02D 5/04 405/280 |
| 909,548 | A * | 1/1909 | Cluxton | E02D 5/04 405/277 |
| 3,342,444 | A * | 9/1967 | Nelson | E04H 12/2215 248/156 |
| 5,106,233 | A * | 4/1992 | Breaux | B09B 1/008 405/129.8 |
| 5,984,587 | A * | 11/1999 | Odle | E01F 9/685 248/530 |
| 6,427,402 | B1 * | 8/2002 | White | E02D 5/08 405/241 |
| 2005/0063784 | A1 * | 3/2005 | Nickelson | B09B 1/00 405/129.57 |
| 2005/0232707 | A1 * | 10/2005 | Reinert, Sr. | E02D 27/42 405/232 |
| 2005/0254905 | A1 * | 11/2005 | Nishiyama | E02D 5/06 405/274 |
| 2012/0192508 | A1 * | 8/2012 | Burdine | E02D 5/80 52/155 |
| 2013/0160694 | A1 * | 6/2013 | Lieng | B63B 21/26 114/304 |
| 2014/0237913 | A1 * | 8/2014 | Kronz | E02D 5/80 52/169.9 |

FOREIGN PATENT DOCUMENTS

| | | | | |
|---|---|---|---|---|
| FR | | 790907 A | * 11/1935 | ............ E02D 5/28 |
| JP | | 60133116 A | * 7/1985 | ............ E02D 5/08 |
| WO | WO-2010133380 A1 | | * 11/2010 | ............ E02D 5/06 |
| WO | WO-2012096932 A1 | | * 7/2012 | ............ E02D 5/285 |

* cited by examiner

EARTHLOC COMPONENT (LOC-PLATE)
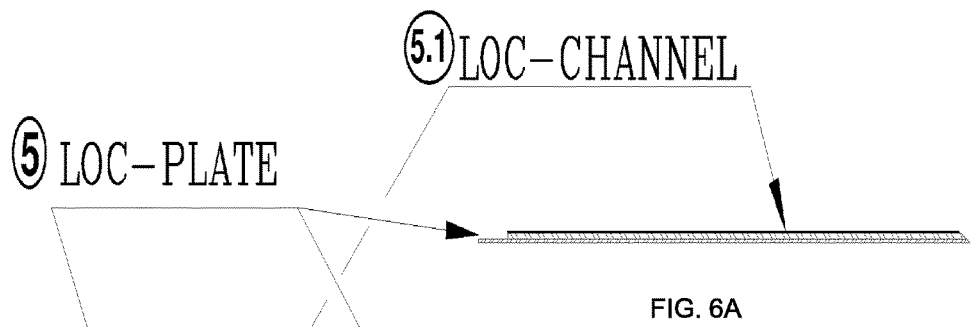
FIG. 6A
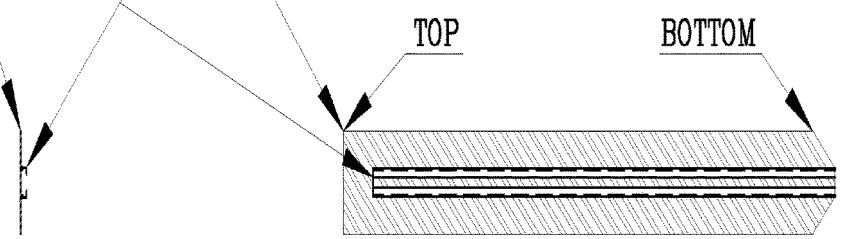
FIG. 6B
FIG. 6C

EARTHLOC COMPONENT (INTERLOC-PLATE)

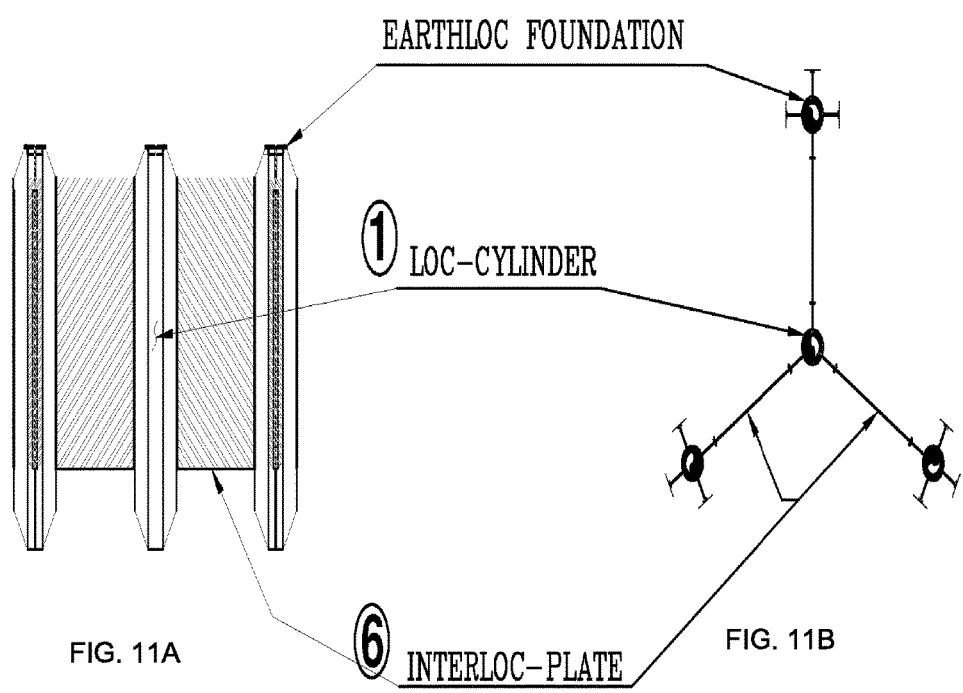

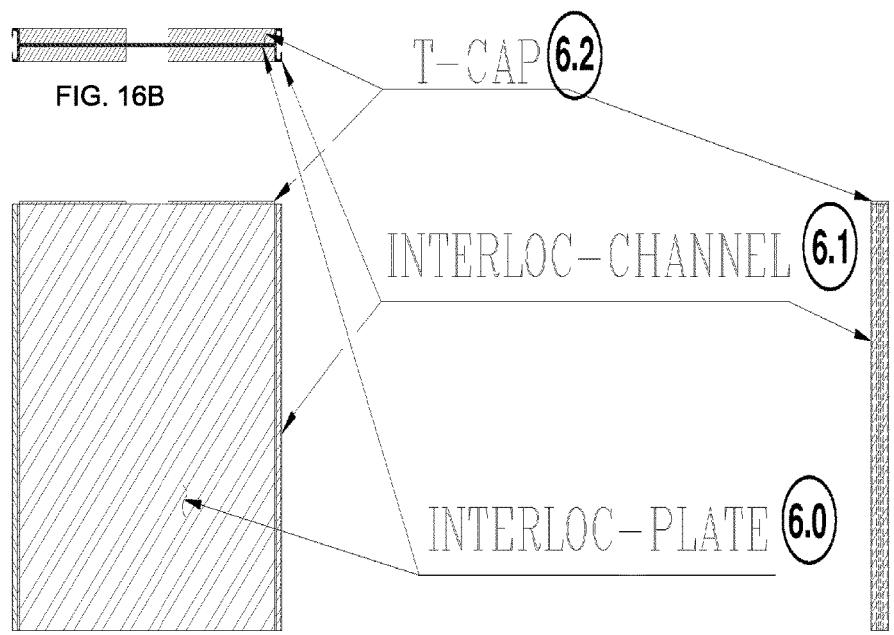

MODULAR GRID FOUNDATION

This is a Non-provisional patent application.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention creates an alternative to concrete as a means to support a structure that is subjected to various load and weight bearing forces such as compression, overturning, torsion, sheer or uplifting. Traditional concrete foundations are essentially a counterweight. Not only is concrete very expensive, the utilization of concrete for a foundation is subject to many restrictions. Many factors that affect installation time are beyond the control of a contractor. But even beyond the uncontrollable factors, there is no way around the enormous amount of time required to complete the arduous twenty-plus step on-site process to build a concrete foundation. Concrete foundations can, and often do fail. There is a need for an alternative to concrete foundations to provide a solution to the many concrete installation problems and the prohibitive cost. The EarthLoc Steel Foundation Module ("ESFM") is design-engineered to lock into the earth to permanently seize (frictional force) enough soil as to guarantee foundational support three to fives time greater in capacity than any force that could be applied to the structure (safety factor). Additionally, on-site installation of an ESFM is a 3-step process—1) Mobilize in, 2) Install, 3) Mobilize out. The average installation time of an typical ESFM is only a matter of hours including unloading, positioning and placement. Normally the only evidence of the installation is the mounting flange ready for the structure to be installed, as nothing in the installation process disturbs the environment. There is little to no disturbance of the site. The grass or ground may be somewhat ruffled by the excavator, truck and trailer, but no soil is disturbed, there is no digging, there is no soil to haul off, so toxic soils are also not an issue. There are no forms to build or iron work to be completed prior to a concrete pour. There is no concrete curing time, therefore weather is a non-issue. There is no need for access for a concrete truck, therefore no heavy-load access roads to require or build. There is no on-site construction of any kind. The ESFMs and add-on components such as Loc-Plates, InterLoc-Plates, ESFM Loc-Cylinder Extenders and ESFM Compression Wedges—that are fabricated off-site—are mobilized in to the site, positioned and driven into the earth by use of a vibratory hammer to provide a permanent (or temporary) foundation. The foundation is immediately ready for the installation of the structure. EarthLoc Steel Foundation Modules are removable and reusuable. Grid applications—such as a crane pad used to support a heavy crane and the weight of the unit/module being lifted by the crane—will employ the EarthLoc Steel Foundation Modular-Grid system. In the grid or array, the ESFMs are interlocked using the unique, self-aligning EarthLoc InterLoc-Plate that employs and InterLoc-Channel that self-aligns to the LocLug that is on the Torsion-Plates of all ESFMs. In this example, when the lift is completed and the crane removed from the site, the ESFMs can be extracted by simply reversing the installation process, and can be transported and used again in the same manner at a new site. The initial cost of fabrication is absorbed with each use, thereby making the use of the EarthLoc system even more cost effective and economical than concrete. Applications for the EarthLoc Steel Foundation Modular-Grid System include but are not limited to grid foundations for any heavy structure or building, crane pads, slab foundation support, levies, refinery pipe racks, metal buildings, metro railway systems, pipelines, conveyors, high mast pole lighting, highway signs, traffic lighting, advertising signs, cell towers, wind turbine towers, power transmission lines, sound walls, retaining walls, security fence, substations, wind turbine towers, and covered parking.

BRIEF SUMMARY OF THE INVENTION

An EarthLoc Steel Foundation Modular System is an EarthLoc Steel Foundation Module ("ESFM), or an interlocked grid of ESFMs design-engineered to support structures that will be subjected to considerable forces from compression, overturning, torsion, sheer, and uplifting. The capacity of the ESFM is determined by the amount of frictional force against the surface area of the steel components of ESFM. The amount of frictional force is determined by the PSI of the various substrates of the soil that is compressed against the surface area (sq. in.) of the components of the ESFM(s). The unique LocLug that is on each Torsion-Plate allows for unlimited on-site ability to add Loc-Plates to greatly increase frictional surface areas perpendicular to the overturning and uplifting forces, and to exponentially support compression loads. ESFMs are designed to interlock by utilization of the InterLoc-Plates that conjoin an array or grid of ESFMs, such that the capacity of each ESFM is transferred to all ESFMs in the grid, therefore creating a foundation that has capacities impossible to obtain with concrete counterweights, and completed at a cost and time schedule that is far less than concrete—with little to no disturbance to the environment. Geo-Technical Soil Reports and structure data are utilized collectively by geo-technical, civil, mechanical and structural engineers to determine the proper model of ESFM that will more than meet the capacities needed to support the structure that will be bolted to or placed upon the ESFM and/or ESFM array or grid. The action to insert an EarthLoc Steel Foundation Module into the ground is known as an "EarthLoc." Multiple ESFMs that are interlocked by the unique self-aligning EarthLoc InterLoc-Channel comprise an EarthLoc Steel Foundation Modular-Grid System. The ESFM will be locked into the earth through a method of installation that employs a vibratory impact device that can impart tremendous pressure to force the ESFM into the earth. The installation process can be reversed to extract the ESFM from the earth to remove it and/or reuse the ESFM in another application at a new site. ESFM System components are removable and reusable. grid foundations for any heavy structure or building, crane pads, slab foundation support, levies, refinery pipe racks, metal buildings, metro railway systems, pipelines, conveyors, high mast pole lighting, highway signs, traffic lighting, advertising signs, cell towers, wind turbine towers, power transmission lines, sound walls, retaining walls, security fence, substations, wind turbine towers, and covered parking.

BRIEF DESCRIPTION OF THE SEVERAL VIEWS OF THE DRAWING

6) FIG. 6A is a side view, FIG. 6B is a plan view, and FIG. 6C is a front view of a concept drawing of the EarthLoc component known as a Loc-Plate that is made up of a steel plate (typically ⅜"×12"×96") and contains the spine of the Loc-Plate known as the Loc-Channel. This component is an addon to any ESFM by driving it down the alignment Loc-Channel onto a Loc-Lug to greatly multiple the inches of friction force to the ESFM.

11) FIG. 11A is a side view and FIG. 11B is a plan view of a concept drawing of the EarthLoc Modular Foundation System that depicts an array of ESFMs with InterLoc-Plates interlocking three (3) ESFMs to a central "hub" ESFM, and also shows LocPlates on each outlying ESFM as add-on components.

16) FIG. 16A is a side view, FIG. 16B is a plan view, and FIG. 16C is an end view of a concept drawing of the EarthLoc component known as the InterLoc-Plate that is a steel plate with the InterLoc-Channel welded to each end, with an T-Cap (Component 6.2) added to the top of the InterLoc-Plate.

DETAILED DESCRIPTION OF THE INVENTION

Figures 1A, 1B:
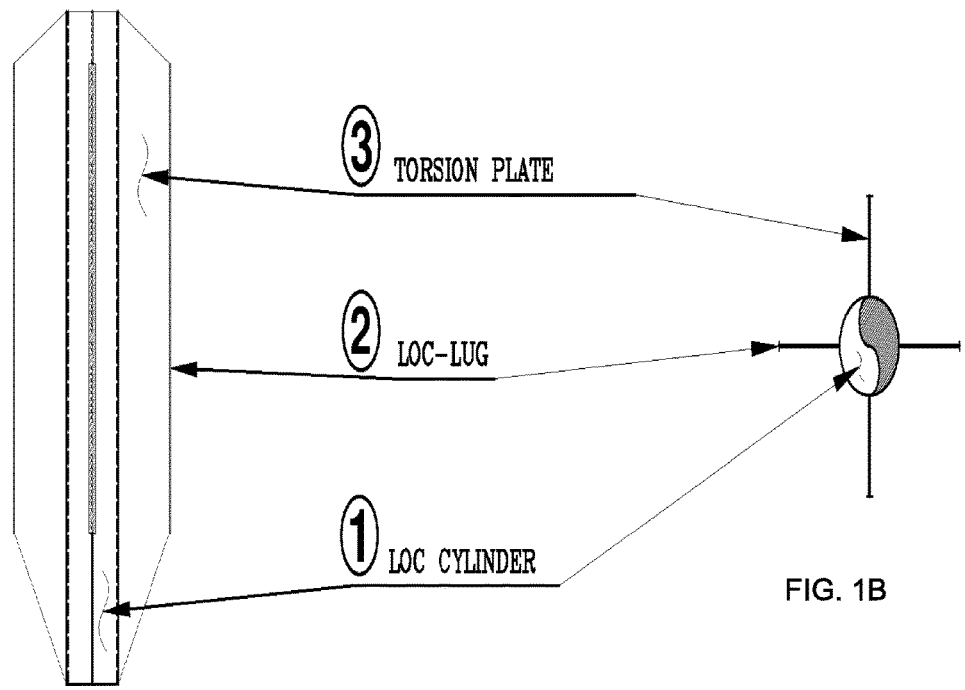
FIG. 1A is a side view and FIG. 1B is a plan view of a concept drawing of the EarthLoc 4-Plate Foundation Module of the base model of an EarthLoc Steel Foundation Module (ESFM) and contains the image three (3) components on all ESFMs—1) the Loc-Cyclinder, 2) 4 Torsion Plates, and 3) the Loc-Lug.
Figures 2A, 2B:
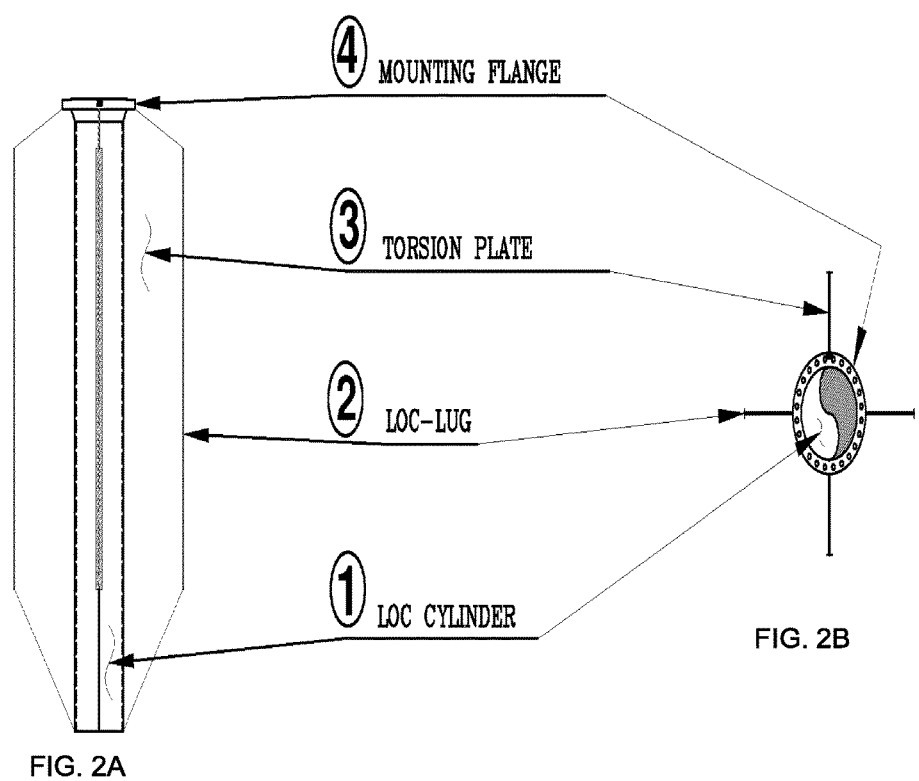
FIG. 2A is a side view and FIG. 2B is a plan view of a concept drawing of the EarthLoc 4-Plate Foundation Module with Mounting Plate of the base model of an EarthLoc Steel Foundation Module (ESFM) that contains the image FOUR (4) components on all ESFMs—1) the Loc-Cyclinder, 2) 4 Torsion Plates, 3) 4 Loc-Lugs and 4) a typical Mounting Flange.
Figures 3A, 3B:
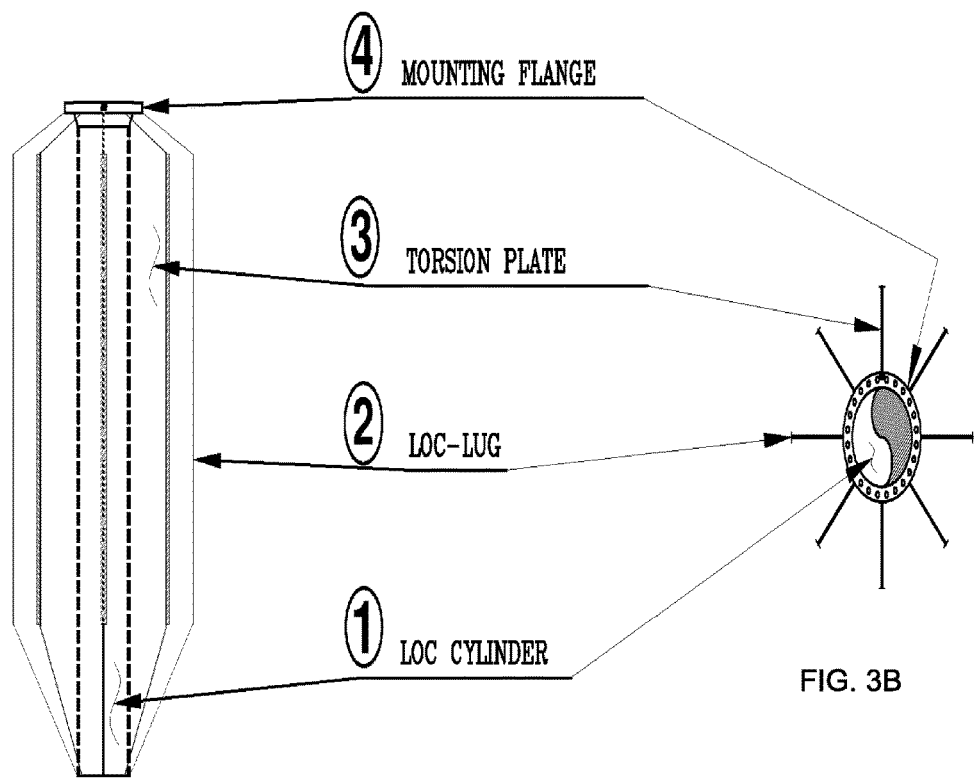
FIG. 3A is a side view and FIG. 3B is a plan view of a concept drawing of the EarthLoc 8-Plate Foundation Module with Mounting Plate of the base model of an EarthLoc Steel Foundation Module (ESFM) with EIGHT Torsion Plates and EIGHT Loc-Lugs in additional to the base model Loc-Cylinder and Mounting Flange, often used with wind turbine towers or the start of an array or grid.
Figures 4A, 4B:
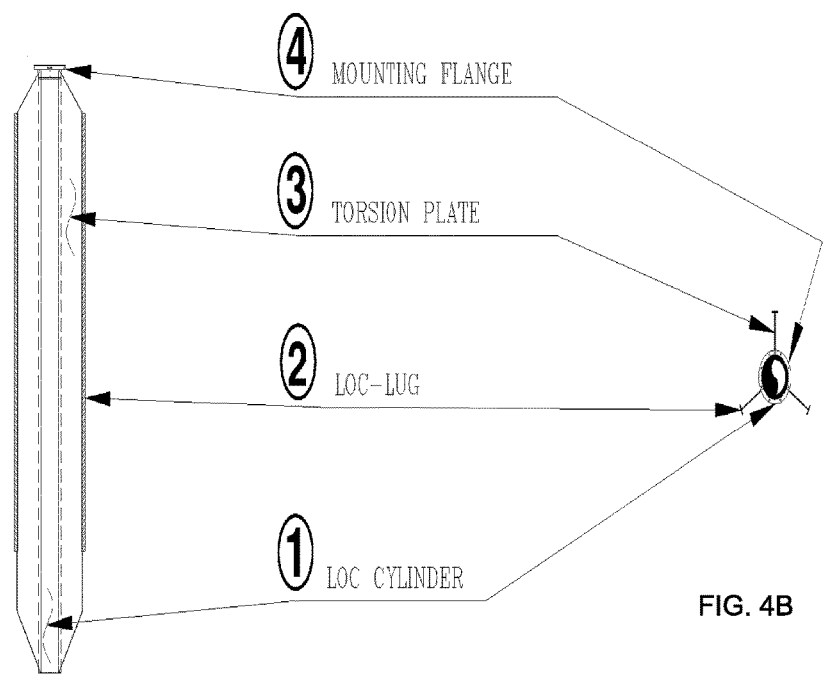
FIG. 4A is a side view and FIG. 4B is a plan view of a concept drawing of the EarthLoc 3-Plate Foundation Module with Mounting Plate of the base model of an EarthLoc Steel Foundation Module (ESFM) with THREE Torsion Plates and THREE Loc-Lugs in additional to the base model Loc-Cylinder and Mounting Flange, typically the model used for the array that includes a hub and outlying ESFMS on a three-legged cell tower.
Figures 5A, 5B:
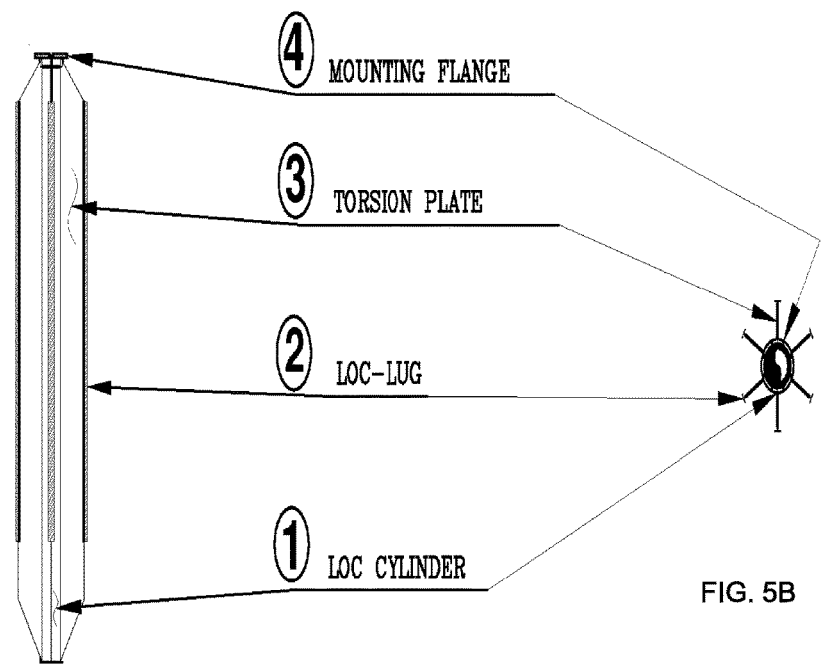
FIG. 5A is a side view and FIG. 5B is a plan view of a concept drawing of the EarthLoc 6-Plate Foundation Module with Mounting Plate of the base model of an EarthLoc Steel Foundation Module (ESFM) with EIGHT Torsion Plates and EIGHT Loc-Lugs in additional to the base model Loc-Cylinder and Mounting Flange, often used with monopole towers or the start of an array or grid than interlocks to outlying ESFM and can utilize the cable tie down system.
Figures 7A, 7B:
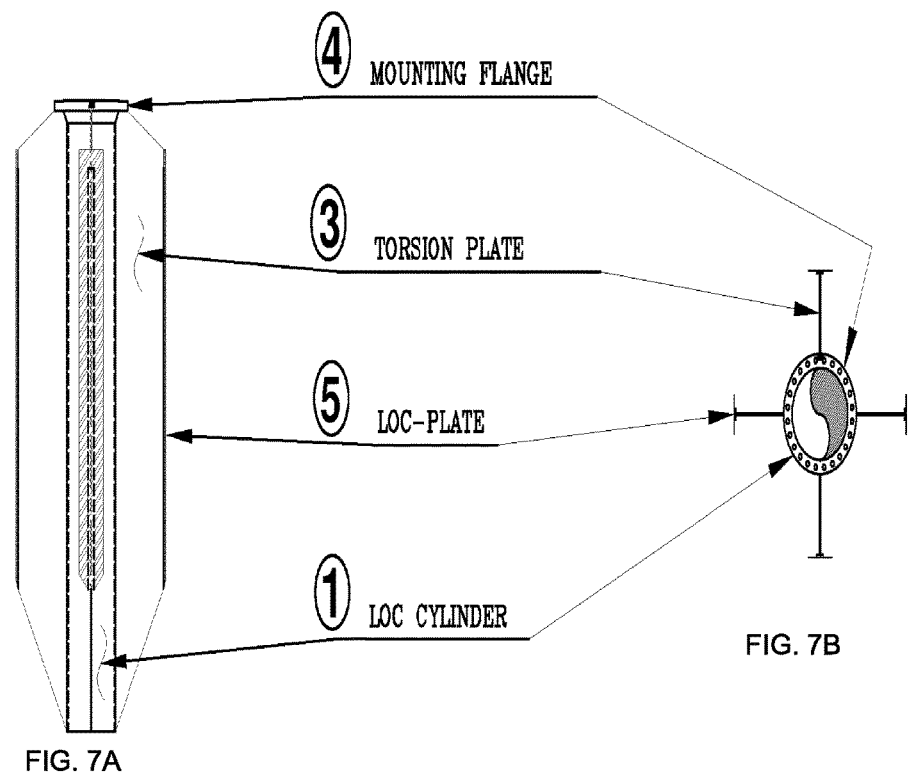
FIG. 7A is a side view and FIG. 7B is a plan view of a concept drawing of the EarthLoc 4-Plate Foundation Module with Mounting Plate of the base model of an EarthLoc Steel Foundation Module (ESFM) adds the Loc-Plates to each of the other four components, creating the strongest module of the stand-alone ESFMs—drawing also shows the image FOUR (4) components on all ESFMs—1) the Loc-Cyclinder, 2) 4 Torsion Plates, 3) 4 Loc-Lugs and 4) a typical Mounting Flange.
Figures 8A, 8B:
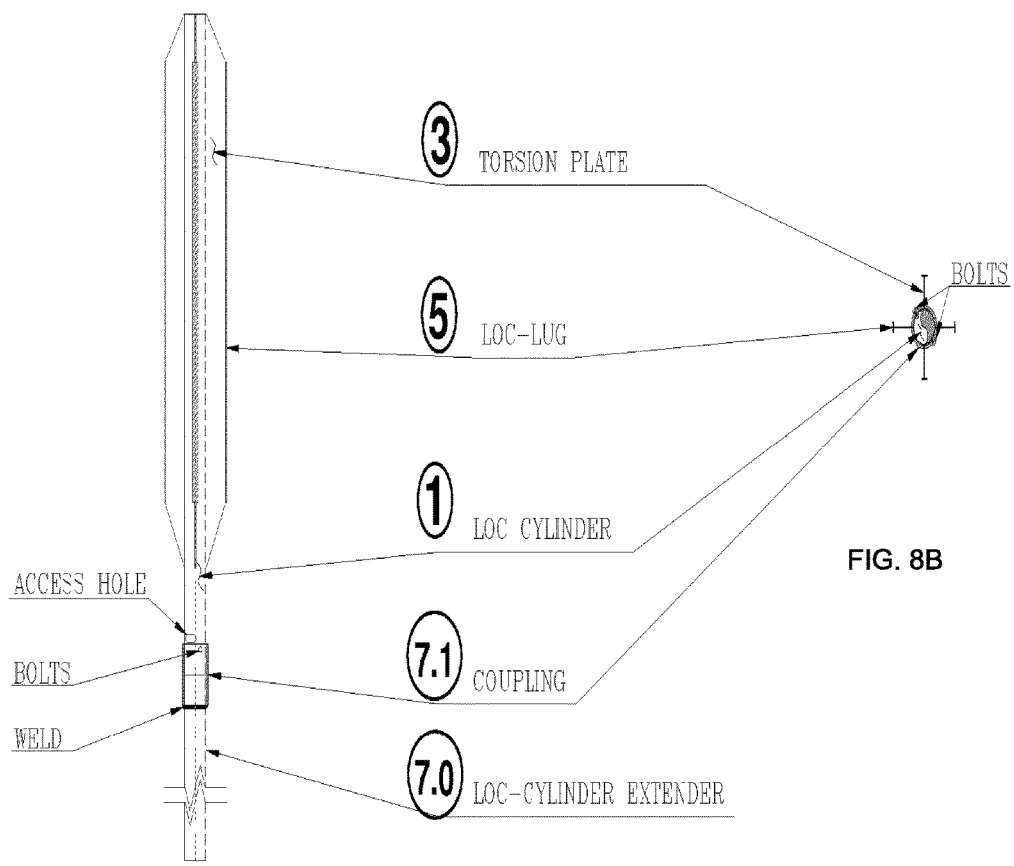
FIG. 8A is a side view and FIG. 8B is a plan view of a concept drawing of the EarthLoc ESFM Loc-Cylinder Extender which is an add-on component of the basic ESFM, being essentially an ESFM that instead of a top-plate or flange, has a pipe sleeve coupling (FIGS. 8.0-7.1) welded to the top of the Loc-Cylinder creating a female union coupling that will be receive the bottom of an ESFM that is bolted to the ESFM Extender.
Figures 9A, 9B:
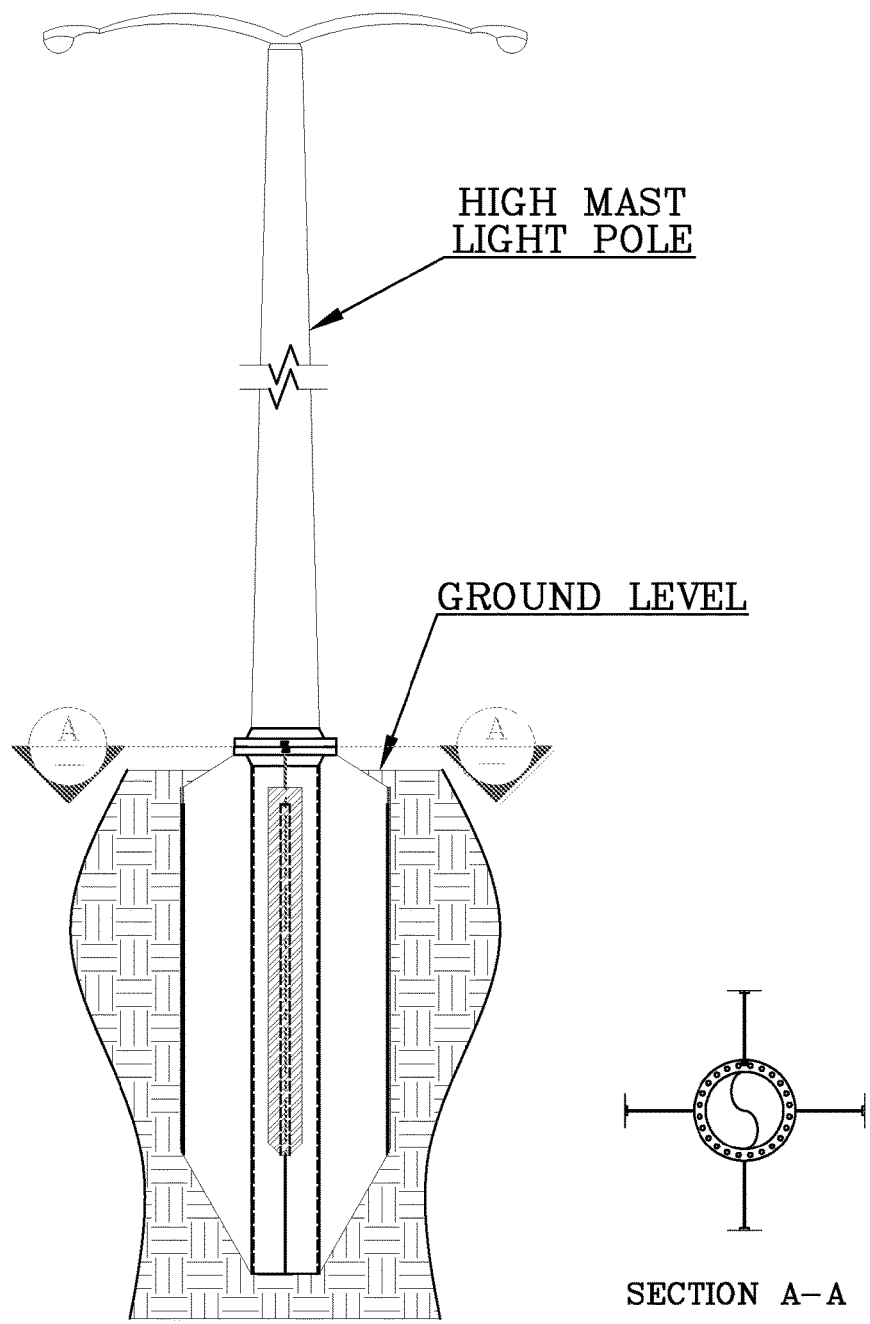
FIG. 9A is a side view and FIG. 9B is a plan view of a concept drawing of a typical High Mast Light Pole atop an EarthLoc Steel Foundation Module utilizing both the base model ESFM with Loc-Plate add-ons.
Figures 10A, 10B, 10C:
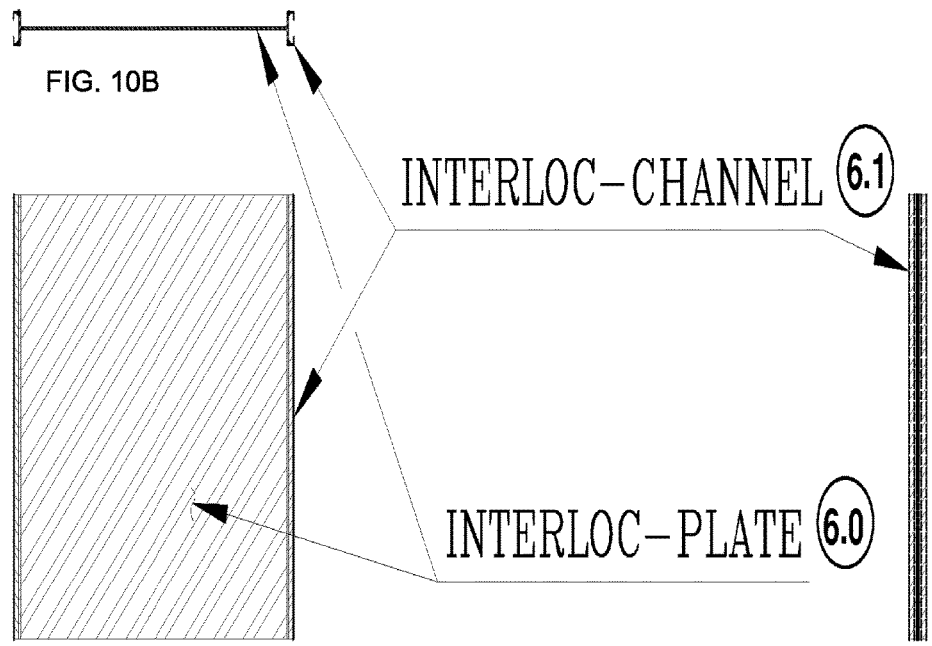
FIG. 10A is a side view.
FIG. 10B is a plan view.
FIG. 10C is an end view of a concept drawing of the EarthLoc component known as the InterLoc-Plate that is a steel plate with the InterLoc-Channel welded to each end.
Figures 12A, 12B:
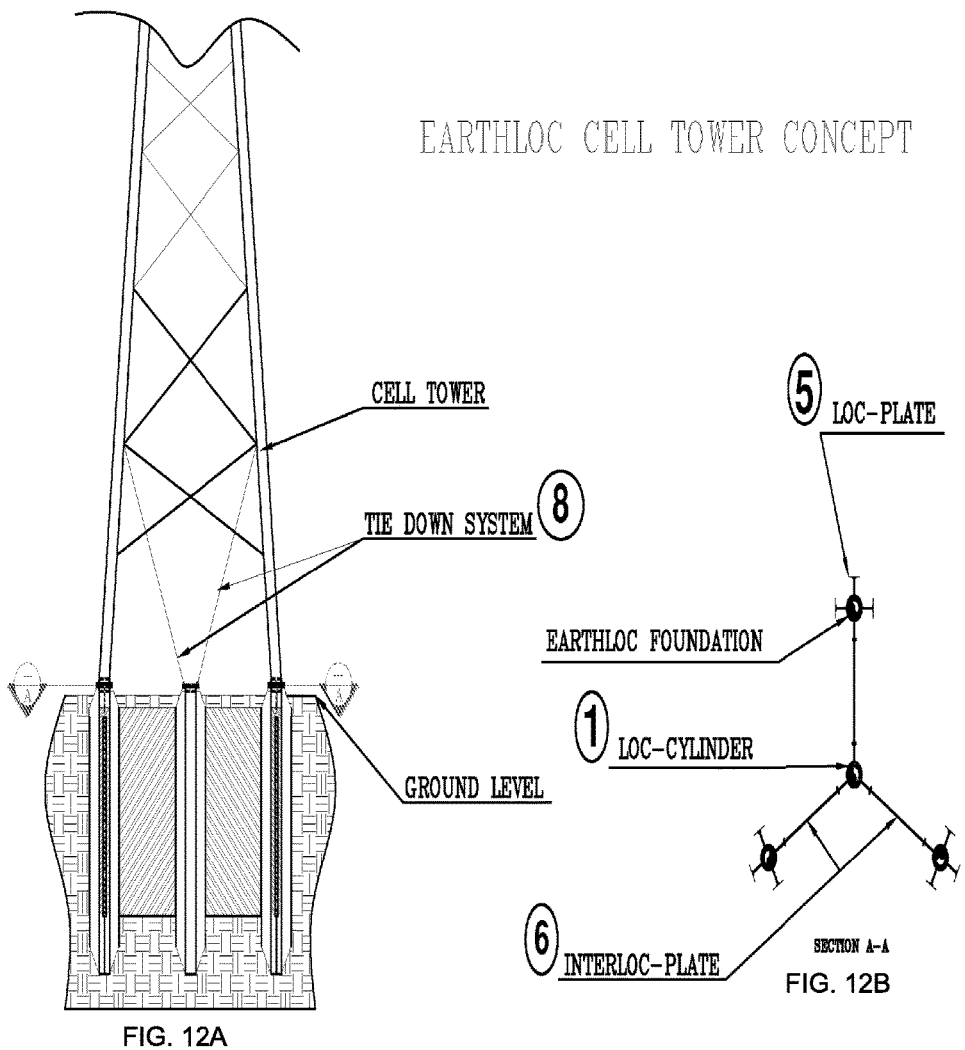
FIG. 12A is a side view and FIG. 12B is a plan view of a concept drawing of the EarthLoc Modular Foundation System Cell Tower Concept that depicts an array of ESFMs with InterLoc-Plates interlocking three (3) ESFMs to a central "hub" ESFM, and also shows LocPlates on each outlying ESFMs as add-on components, with the legs of a three-legged cell tower mounted to the flange plate of the outlying ESFMs, and a Tie-Down System of the legs of the cell tower to the central "hub" ESFM.
Figures 13A, 13B:
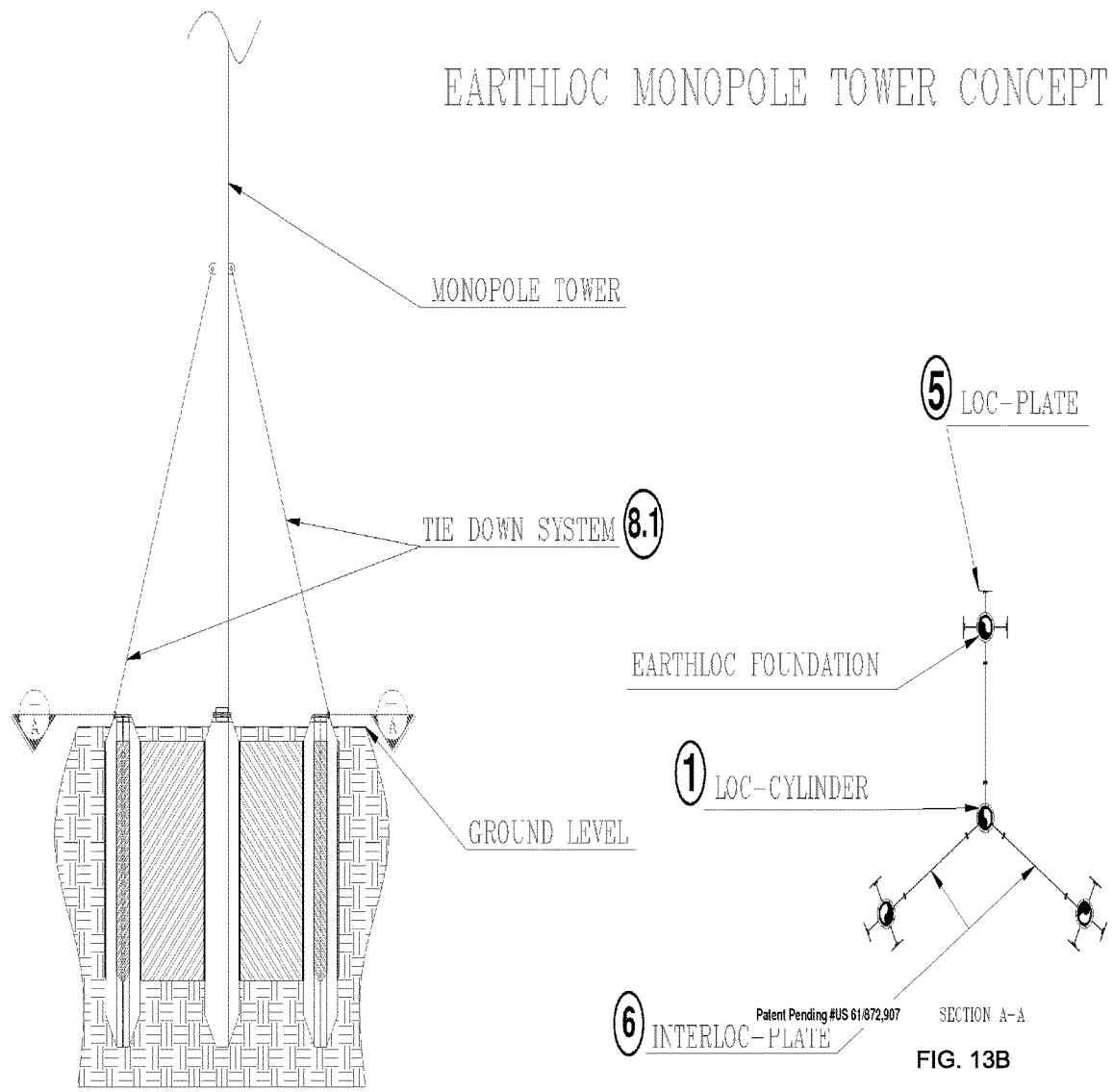
FIG. 13A is a side view and FIG. 13B is a plan view of a concept drawing of the EarthLoc Modular Foundation System Monopole Tower Concept that depicts an array of ESFMs with InterLoc-Plates interlocking three (3) ESFMs to a central "hub" ESFM, and also shows LocPlates on each outlying ESFM as add-on components, with the monopole tower mounted to the flange plate of the central "hub" ESFM, and a Tie-Down System of the monopole tower to the outlying ESFMs.
Figures 14A, 14B, 14C:
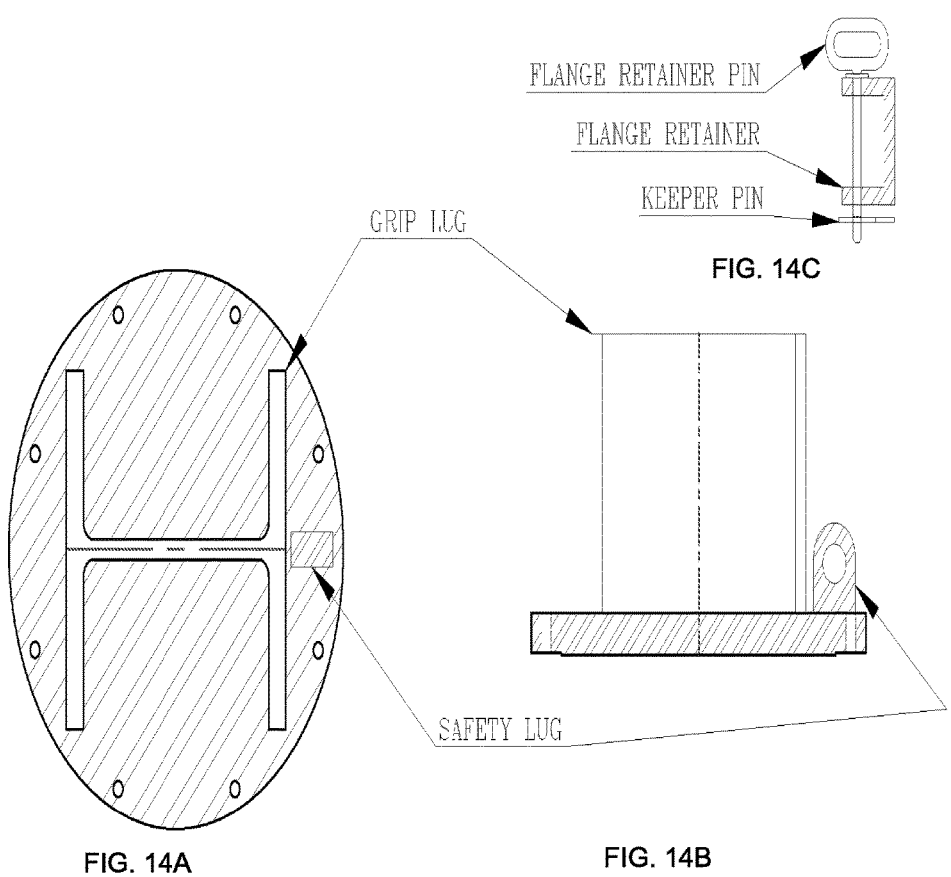
FIG. 14A is a plan view.
FIG. 14B is a side view.
FIG. 14C is an end view of a concept drawing of the EarthLoc Installation Flange that shows the base model tool used to install ESFMs quickly and safely, and includes the blind flange plate, grip lug, safety lug, and Flange Retainer with flange retainer pins and keeper pins, collectively the EarthLoc Installation Flange.
Figures 15A, 15B:
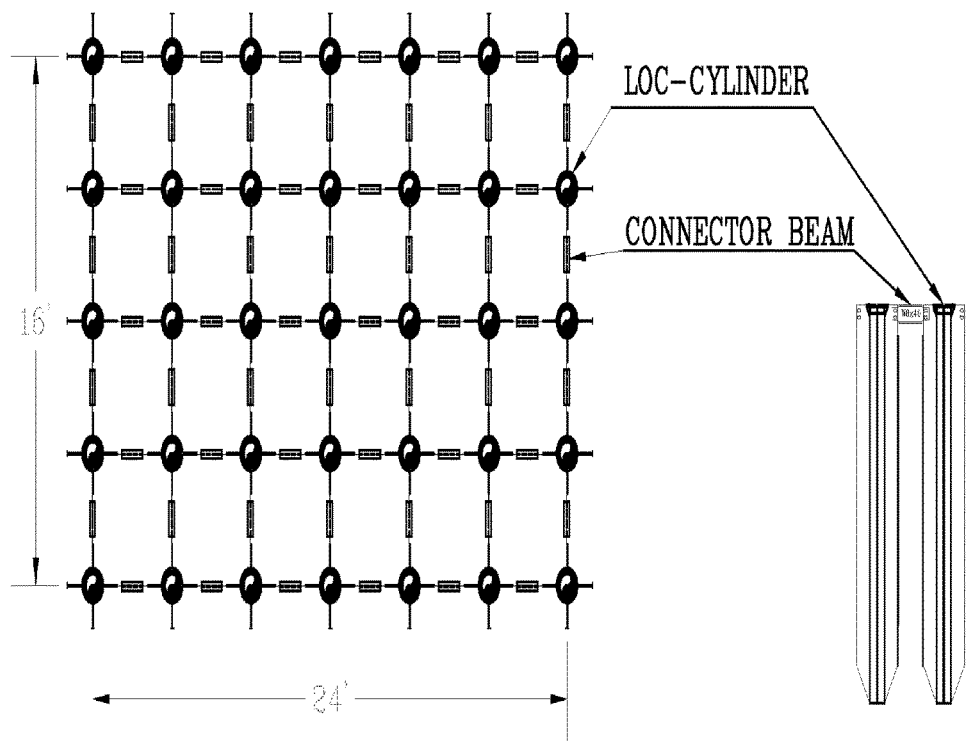
FIG. 15A is a plan view and FIG. 15B is an elevation view of a concept drawing of the EarthLoc Modular-Grid System that shows a grid of ESFMs interlocked using the EarthLoc Connector Beam system that shows a knife-connection made by coping a W-Beam and bolting the Connector Beam to slotted holes in the Torsion Plates of the ESFMs. The EarthLoc Modular-Grid System typically utilizes the Loc-Lug and InterLoc-Plate self-aligning interlock system, but the connector beam system (as depicted in this concept drawing) is a viable alternative in some applications.
Figures 17A, 17B:
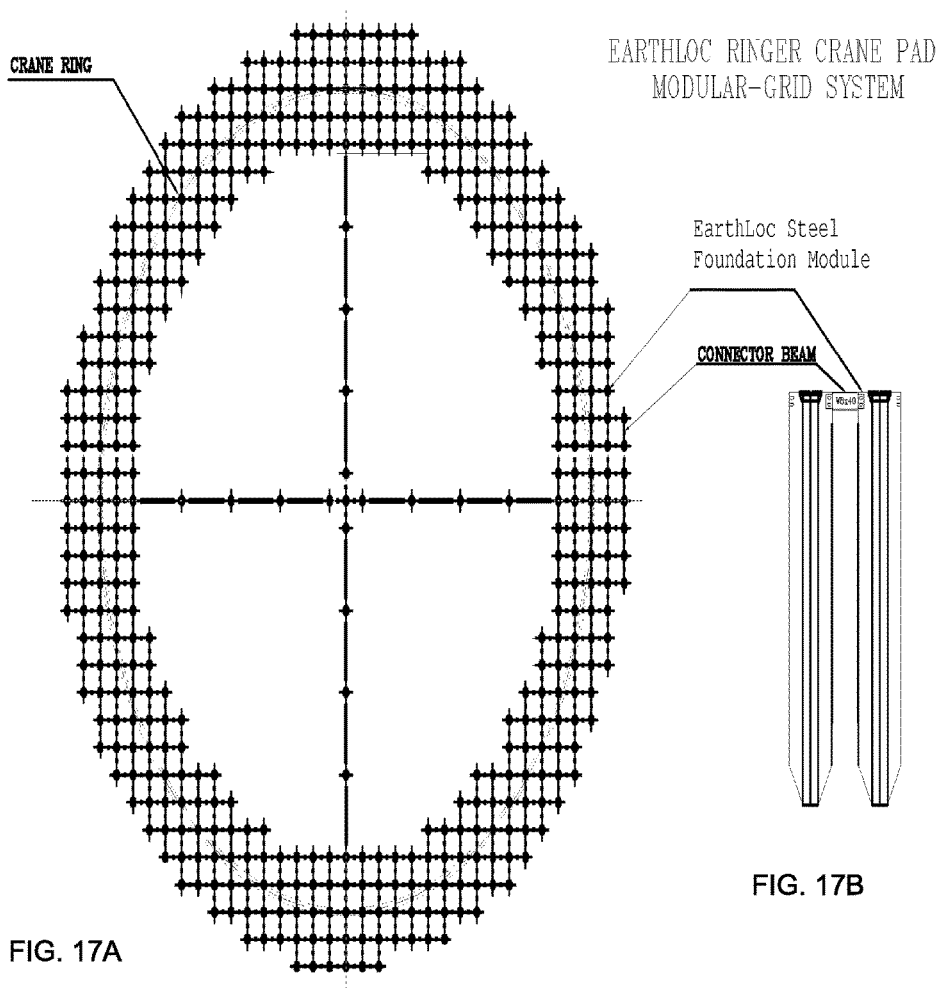
FIG. 17A is a plan view and FIG. 17B is an elevation view of a concept drawing of the EarthLoc Ringer Crane Pad Modular-Grid System that shows a grid of ESFMs interlocked using the EarthLoc Connector Beam system that shows a knife-connection made by coping a W-Beam and bolting the Connector Beam to slotted holes in the Torsion Plates of the ESFMs. The EarthLoc Modular-Grid System typically utilizes the Loc-Lug and InterLoc-Plate self-aligning interlock system, but the connector beam system (as depicted in this concept drawing) is a viable alternative in this application.

An EarthLoc Steel Foundation Modular System is an EarthLoc Steel Foundation Module ("ESFM"), or an interlocked grid of ESFMs design-engineered to support structures that will be subjected to considerable forces from compression, overturning, torsion, sheer, and uplifting. The capacity of the ESFM is controlled by the amount of frictional force against the surface area of the steel components of ESFM. The amount of frictional force is determined by the PSI of the various substrates of the soil compressed against the surface area (sq. in.) of the ESFM(s). Additionally, the ESFM surface areas that are perpendicular to forces imparted on the structure create capacity against overturning, torsion, and uplifting. Geo-Technical Soil Reports and structure data are utilized collectively by geo-technical, civil, mechanical and structural engineers to determine the proper model of ESFM that will more than meet the capacities needed to support the structure that will be bolted to or placed upon the ESFM and/or ESFM array or grid. The action to insert an ESFM into the ground is known as an "EarthLoc." Multiple ESFMs that are interlocked comprise an EarthLoc Steel Foundation Modular-Grid System. The ESFM will be locked into the earth through a method of installation that employs a vibratory impact device that can impart tremendous pressure to force the foundation into the earth. A single foundation is known as an EarthLoc Module (FIGS. 1A and 1B). An EarthLoc Module is designed to be part of an EarthLoc Modular System (FIGS. 11A and 11B) or Grid (FIGS. 15A, 15B, 17A, and 17B). The ESFM can be permanent or the installation process can be reversed to remove (extract) the foundation. The ESFMs are removable and reusable. The ESFM assembly is comprised of 1) a Loc-Cylinder (steel pipe) FIGS. 1A and 1B), 2) Torsion-plates (steel plate) (FIGS. 1A and 1B) welded perpendicular to the Loc-Cylinder, and 3) a Loc-Lug (male) (FIGS. 1A and 1B) welded on the outer edge and perpendicular to the Torsion-Plate. The bottom edges of all ESFM components are sharply beveled and the corners are tapered to create a knife-point, knife-edge that—because of the installation process that drives the ESFM knifed-edges into the soil—causes a phenomenon that ensures the greatest frictional force against all surfaces of the ESFM. In many applications a fourth component will be a flange (FIGS. 2A and 2B) or other steel plate affixed to the top of the foundation (top plate) upon which the structure will be mounted and secured. In grid systems the structure may simply rest upon the top plate where compression is the only factor. The EarthLoc module models can range from a 2 inch to a 48 inch Loc-Cylinder with Torsion-Plates (typically of width equal to the Loc-Cylinder diameter but width can vary) welded perpendicular to the Loc-Cylinder—with the LocLug (FIGS. 1A and 1B) welded perpendicular to the outer edge of each Torsion-Plate and parallel to the Loc-Cylinder, thereby creating not-only additional frictional surface area, but establishing the first component of the unique, self-aligning EarthLoc InterLoc system. The ESFM will commonly be assembled with three (3) to eight (8) Torsion-Plates as dictated by the determinations of a professional engineer based on the geo-technical soil report and the structure data, collectively considering the capacity needed to support the load bearing forces. The specifications of the ESFM for each application are determined by whether it will be a stand-alone ESFM, or one of multiple interlocked ESFMs that make up a grid connected by the unique, self-aligning LocLug and InterLoc-Plate system and/or a knife-connection beam system. The ESFM can be strengthened on-site by installation of a LocPlate (FIGS. 6A-C), an add-on component of the basic ESFM, the LocPlate being a steel plate (typically ⅜"×12"×8') that has a unique InterLoc alignment channel (female) (FIGS. 6A-C) that is a "spine" that runs the length of the LocPlate, which is fitted on and driven down over the LocLug to interlock to the Torsion-Plate, thereby adding many additional square inches of soil surface area to the ESFM as the sharp, beveled lower edge of the LocPlate knifes into the soil, uniquely self-aligning via the InterLoc alignment channel down onto the LocLug, locking into the earth parallel to the Loc-Cyclinder and perpendicular to the Torsion Plate, creating an additional of 2304 sq. inches of surface area per LocPlate (typical LocPlate; up to 8 per ESFM) that causes an exponential increase in frictional force and tonnage of soil that is locked by the EarthLoc Steel Foundation Module Assembly. In some applications, additional ESFMs will be interlocked by utilization of an InterLoc-Plate (FIGS. 10A-10C)—a steel plate typically ⅜"×4'× 8' (but can be any thickness, height or length) that has on each end an InterLoc-Channel (FIGS. 10A-10C) that is secured and driven down onto the LocLug of an installed ESFM. The additional perimeter EarthLoc module(s) is/are then installed by aligning the LocLug on the Torsion-Plate of outlying ESFM and driving the ESFM into the earth—self-aligning the outlying ESFM. The collective interlocked ESFMS comprise the EarthLoc Modular-Grid System. Interlocking joints in a permanent installation—created by installation of a LocPlate and/or an InterLocPlate—will be capped and welded to conjoin all modular components parts into one complete foundation unit (See Cell Tower foundation: FIGS. 12A and 12B), whereas in a non-permanent system modular system or grid interlocking joints will be secured with a knife-connector that is welded to the InterLoc-Plate and pinned, said pin being easily and quickly removed for disassembly, extraction and relocation for reuse at another site. To reach superior soils located deeper into the earth, the ESFM can quickly and easily be extended on-site by installation of a ESFM Loc-Cylinder Extender (FIGS. 8A-17B), an add-on component of the basic ESFM, being essentially an ESFM that instead of a top-plate or flange, has a pipe sleeve coupling (FIGS. 8A-17B) welded to the top of the Loc-Cylinder creating a female union coupling that will be receive the bottom of an ESFM that is bolted to it, allowing for the ESFM to be of any length necessary to reach soils that will provide enough frictional force to support the load. When a modular system is employed that utilizes a center or "hub" foundation, the structure can be tied down using cables and turnbuckles from a point on the legs of the structure to lugs on the hub (center) foundation. (FIGS. 8A-12B) The ESFMs and add-on components such as Loc-Plates, ESFM Loc-Cylinder Extenders, and/or Inter-Loc-Plates—that are fabricated off-site—are mobilized in to the site, positioned and driven into the earth by use of a vibratory hammer to provide a permanent (or temporary) foundation. The speed of installation that can be done 365 days a year in any kind of weather, regardless of temperature, adds incalculable value. All components are hot-dipped galvanized to insure protection against corrosion. A specially designed blind EarthLoc™ Installation Flange™ (FIGS. 14A-C) is employed to facilitate safety and speed in the installation process. Applications for the EarthLoc Steel Foundation Modular-Grid System include but are not limited to grid foundations for any heavy structure or building, crane pads, slab foundation support, levies, refinery pipe racks, metal buildings, metro railway systems, pipelines, conveyors, high mast pole lighting, highway signs, traffic lighting, advertising signs, cell towers, wind turbine towers, power transmission lines, sound walls, retaining walls, security fence, substations, wind turbine towers, and covered parking.

The invention claimed is:

1. A method of building a grid system, said method comprising:
    arranging a plurality of modular apparatuses at a structure site, the plurality modular apparatuses having a central tubular member having an inner bore formed along a longitudinal length and a plurality of vanes having a lateral width at least equal to a diameter of the central tubular member and extending substantially the length of the tubular member, wherein the plurality of modular apparatuses are positioned above a surface of the structure site configured to receive one or more structures erected thereon;
    connecting the plurality of modular apparatuses by coupling more than two adjacent modular apparatuses of the plurality of modular apparatuses with a connector beam or the plurality of vanes with one or more locking lugs disposed on the plurality of vanes received in a corresponding locking channel of an interlock plate, wherein at least a portion of the plurality of modular apparatuses are operably coupled to more than two adjacent modular apparatuses of the plurality of the modular apparatuses
    installing the plurality of modular apparatuses into the earth wherein the inner bore receives earthen formation therein;
    wherein the plurality of modular apparatuses includes at least three modular apparatuses in an X-plane and at least three modular apparatus in a Y-plane, thereby forming a grid of at least three modular apparatuses by at least three modular apparatuses.

2. The method of claim 1, further comprising a locking channel disposed on a locking channel connection plate wherein the locking channel connection plate is connected perpendicular to one or more of the plurality of modular apparatuses, thereby providing an extension of one or more of the plurality of vanes.

3. The method of claim 1, wherein the locking lug is configured to be received in a correspondingly shaped locking channel.

4. The method of claim 1, wherein at least one of the central tubular member and the plurality of vanes is formed from steel having a coating formed thereon.

5. A modular grid foundation system, comprising:
    a plurality of modular foundation apparatuses, each of the plurality of modular foundation apparatuses comprising:
        a central tubular member having a longitudinal length;
        a plurality of vanes having a lateral width at least equal to a diameter of the central tubular member and extending substantially the longitudinal length of the tubular member, the lateral width extending perpendicularly from the central tubular member; and
        a locking lug having a lateral width, the locking lug perpendicularly coupled to an external edge of at least one vane of the plurality of vanes;
    wherein the plurality of modular foundation apparatuses are coupled one to another, in both in an x-plane and a y-plane,
    wherein at least a portion of the plurality of modular apparatuses are tangentially coupled to more than two modular foundation apparatuses of the plurality of the modular foundation apparatuses.

6. The modular grid foundation system of claim 5, wherein two or more of the plurality of vanes has a locking lug disposed on the external edge thereof.

7. The modular grid foundation system of claim 5, wherein a locking channel is coupled with the external edge of at least one vane of the plurality of vanes.

8. The modular grid foundation system of claim 7, wherein the plurality of vanes is four vanes, two vanes having a locking lug disposed on the external edge thereof.

9. The modular grid foundation system of claim 5, further comprising a locking plate having one or more locking channels formed thereon, the one or more locking channels of the locking plate configured to matingly engage with one or more locking lugs of at least one modular apparatus of the plurality of modular apparatuses.

10. The modular grid foundation system of claim 5, further comprising a locking channel disposed on a locking channel connection plate wherein the locking channel connection plate is connected perpendicular to one or more of the modular apparatuses, thereby providing an extension of one or more of the plurality of vanes.

11. The modular grid foundation system of claim 5, wherein the locking lug is configured to be received in a correspondingly shaped locking channel.

12. The modular grid foundation system of claim 5, wherein at least one of the central tubular member and the plurality of vanes is formed from steel having a coating formed thereon.

* * * * *